United States Patent
Whitney et al.

(10) Patent No.: US 10,365,978 B1
(45) Date of Patent: Jul. 30, 2019

(54) SYNCHRONIZATION OF SNAPSHOTS IN A DISTRIBUTED CONSISTENCY GROUP

(71) Applicant: EMC IP Holding Company LLC, Hopkinton, MA (US)

(72) Inventors: William C. Whitney, Marlborough, MA (US); Dmitry Nickolayevich Tylik, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 81 days.

(21) Appl. No.: 15/662,801

(22) Filed: Jul. 28, 2017

(51) Int. Cl.
*G06F 11/14* (2006.01)
*G06F 11/20* (2006.01)
*G06F 9/455* (2018.01)
*G06F 16/23* (2019.01)

(52) U.S. Cl.
CPC ...... *G06F 11/1464* (2013.01); *G06F 11/2064* (2013.01); *G06F 16/2365* (2019.01); *G06F 2009/45583* (2013.01); *G06F 2201/84* (2013.01)

(58) Field of Classification Search
CPC ............. G06F 11/1464; G06F 11/2064; G06F 17/30371
See application file for complete search history.

(56) References Cited

U.S. PATENT DOCUMENTS

| | | | |
|---|---|---|---|
| 7,593,351 B1 * | 9/2009 | Zioulas | H04L 43/00 340/3.2 |
| 7,769,722 B1 | 8/2010 | Bergant et al. | |
| 8,364,648 B1 * | 1/2013 | Sim-Tang | G06F 17/30368 707/674 |
| 8,706,833 B1 | 4/2014 | Bergant et al. | |
| 8,966,382 B1 | 2/2015 | Yehuda et al. | |
| 9,594,822 B1 | 3/2017 | Natanzon et al. | |
| 9,740,571 B1 | 8/2017 | Chopra et al. | |
| 2002/0133512 A1 * | 9/2002 | Milillo | G06F 11/2082 |
| 2014/0189429 A1 * | 7/2014 | Gill | G06F 11/1446 714/19 |
| 2015/0120645 A1 * | 4/2015 | Varakur | G06F 17/30377 707/607 |
| 2016/0253240 A1 * | 9/2016 | Cocagne | G06F 3/0619 714/764 |
| 2017/0031776 A1 * | 2/2017 | Ren | G06F 11/1461 |
| 2018/0157561 A1 * | 6/2018 | Venkatesh | G06F 8/63 |

\* cited by examiner

*Primary Examiner* — Ryan Bertram
(74) *Attorney, Agent, or Firm* — BainwoodHuang

(57) ABSTRACT

Techniques for synchronizing snapshot operations in a distributed consistency group of storage volumes. The disclosed techniques employ a schedule of discrete snapshot operations (e.g., pausing I/O requests from host computers, taking snapshots of storage volumes, un-pausing the I/O requests), which is provided to storage appliances storing the storage volumes within the distributed consistency group. By pre-scheduling such discrete snapshot operations to be performed by the storage appliances, an amount of real-time communications (e.g., issuing snapshot commands, receiving snapshot acknowledgements) required to complete the snapshot operations is reduced, allowing data storage systems to more easily satisfy I/O time-out requirements and avoid application unresponsiveness and/or crashes.

18 Claims, 4 Drawing Sheets

Fig. 2 – Prior art

SYNCHRONIZATION OF SNAPSHOTS IN A DISTRIBUTED CONSISTENCY GROUP

BACKGROUND

Conventional data storage systems commonly create snapshots of the data storage systems at certain points in time for a variety of purposes, including, but not limited to, backing-up storage volumes of data, providing operational and disaster recovery, improving application availability, and reducing data management costs. Such snapshots can be used to record states of the data storage systems, as well as provide point-in-time (PIT) views of consistency groups, which represent sets of storage volumes of applications stored on storage appliances within the data storage systems. By maintaining consistency among data stored on the sets of storage volumes of the consistency groups, the applications can successfully recover from failures (e.g., database errors, etc.) using consistent data for the storage volumes at one or more points-in-time (PITs) of the data storage systems. Such consistent data for the storage volumes can also be used for data recovery in the event an accident, disaster, or other catastrophic failure causes data at a production site to be lost.

SUMMARY

In such conventional data storage systems, a PIT view of a consistency group is typically obtained by issuing snapshot commands to a storage appliance that stores a set of storage volumes represented by the consistency group, and receiving snapshot acknowledgements from the storage appliance once snapshot operations specified by the snapshot commands have been completed. For example, such snapshot operations can include pausing (or suspending) input/output (I/O) requests (e.g., write/read requests) from host computers, taking snapshots of the storage volumes stored on the storage appliance, and un-pausing (or resuming) I/O requests from the host computers.

However, obtaining such a PIT view of a consistency group can be problematic if the set of storage volumes (e.g., logical storage units (LUNs), virtual machine volumes (VVOLs)) within the consistency group is distributed across a cluster of storage appliances within the data storage system. For example, such a cluster of storage appliances can be coupled to a local area network (LAN), an Ethernet sub-network, a PCI or PCIe sub-network, a switched PCIe sub-network, a wide area network (WAN), a metropolitan area network (MAN), or the Internet. Further, issuing snapshot commands to the respective storage appliances within the cluster, and waiting to receive snapshot acknowledgements from the respective storage appliances in real-time, can result in delays that make it difficult, if not impossible, to satisfy specified I/O time-out requirements, potentially causing applications to become unresponsive and/or crash.

Techniques are disclosed herein for synchronizing snapshot operations in a distributed consistency group of storage volumes. The disclosed techniques employ a schedule of discrete snapshot operations (e.g., pausing I/O requests, taking snapshots of storage volumes, un-pausing the I/O requests), which is provided to storage appliances storing the storage volumes within the distributed consistency group. By pre-scheduling such discrete snapshot operations to be performed by the storage appliances, the amount of real-time communications (e.g., issuing snapshot commands, receiving snapshot acknowledgements) required to complete the snapshot operations is reduced, allowing data storage systems to more easily satisfy I/O time-out requirements and avoid application unresponsiveness and/or crashes.

In certain embodiments, a method of synchronizing snapshot operations in a distributed consistency group of storage volumes includes generating a schedule for performing two or more discrete snapshot operations at a plurality of storage appliances that store a plurality of storage volumes, respectively, in the distributed consistency group. The schedule indicates predetermined times when the respective discrete snapshot operations are to be performed at the plurality of storage appliances. The method further includes sending the schedule to each of the plurality of storage appliances, performing the two or more discrete snapshot operations at each of the plurality of storage appliances at the predetermined times indicated by the schedule to create a plurality of snapshots of the plurality of storage volumes, respectively, in the distributed consistency group, and reconciling the plurality of snapshots of the respective storage volumes in the distributed consistency group to assure their validity. The schedule can indicate at least a first operation to be performed at a first predetermined time for pausing input/output (I/O) requests at the respective storage appliances, and a second operation to be performed at a second predetermined time for taking snapshots of storage volumes stored by the respective storage appliances. The schedule can incorporate a delay prior to the second predetermined time to assure that the first operation is completed at the respective storage appliances before the second operation is performed at the respective storage appliances. The schedule can further indicate a third operation to be performed at a third predetermined time for un-pausing the I/O requests at the respective storage appliances.

In certain further embodiments, a system for synchronizing snapshot operations in a distributed consistency group of storage volumes includes a computerized snapshot management system, a plurality of storage appliances configured to store a plurality of storage volumes, respectively, in the distributed consistency group, and a network configured to interconnect the computerized snapshot management system and the plurality of storage appliances. The computerized snapshot management system is operative to generate a schedule for performing two or more discrete snapshot operations at the plurality of storage appliances. The schedule indicates predetermined times when the respective discrete snapshot operations are to be performed at the plurality of storage appliances. The computerized snapshot management system is further operative to send the schedule to each of the plurality of storage appliances over the network. Each of the plurality of storage appliances is operative to perform the two or more discrete snapshot operations at the predetermined times indicated by the schedule to create a snapshot of a respective storage volume stored by the storage appliance. The computerized snapshot management system is further operative to reconcile the plurality of snapshots of the respective storage volumes in the distributed consistency group to assure their validity.

Other features, functions, and aspects of the invention will be evident from the Detailed Description that follows.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 3a is a timing diagram illustrating exemplary pre-scheduled snapshot operations performed by the data storage system of FIG. 1 to obtain a PIT view of a distributed consistency group of storage volumes;

FIG. 3b is a diagram of an exemplary schedule employed by the data storage system of FIG. 1 to perform the pre-scheduled snapshot operations of FIG. 3a.

DETAILED DESCRIPTION

Techniques are disclosed herein for synchronizing snapshot operations in a distributed consistency group of storage volumes. The disclosed techniques employ a schedule of discrete snapshot operations (e.g., pausing input/output (I/O) requests, taking snapshots of storage volumes, un-pausing the I/O requests), which is provided to storage appliances storing the storage volumes within the distributed consistency group. By pre-scheduling such discrete snapshot operations to be performed by the storage appliances, the amount of real-time communications (e.g., issuing snapshot commands, receiving snapshot acknowledgements) required to complete the snapshot operations is reduced, allowing data storage systems to more easily satisfy I/O time-out requirements and avoid application unresponsiveness and/or crashes.

Figure 1:
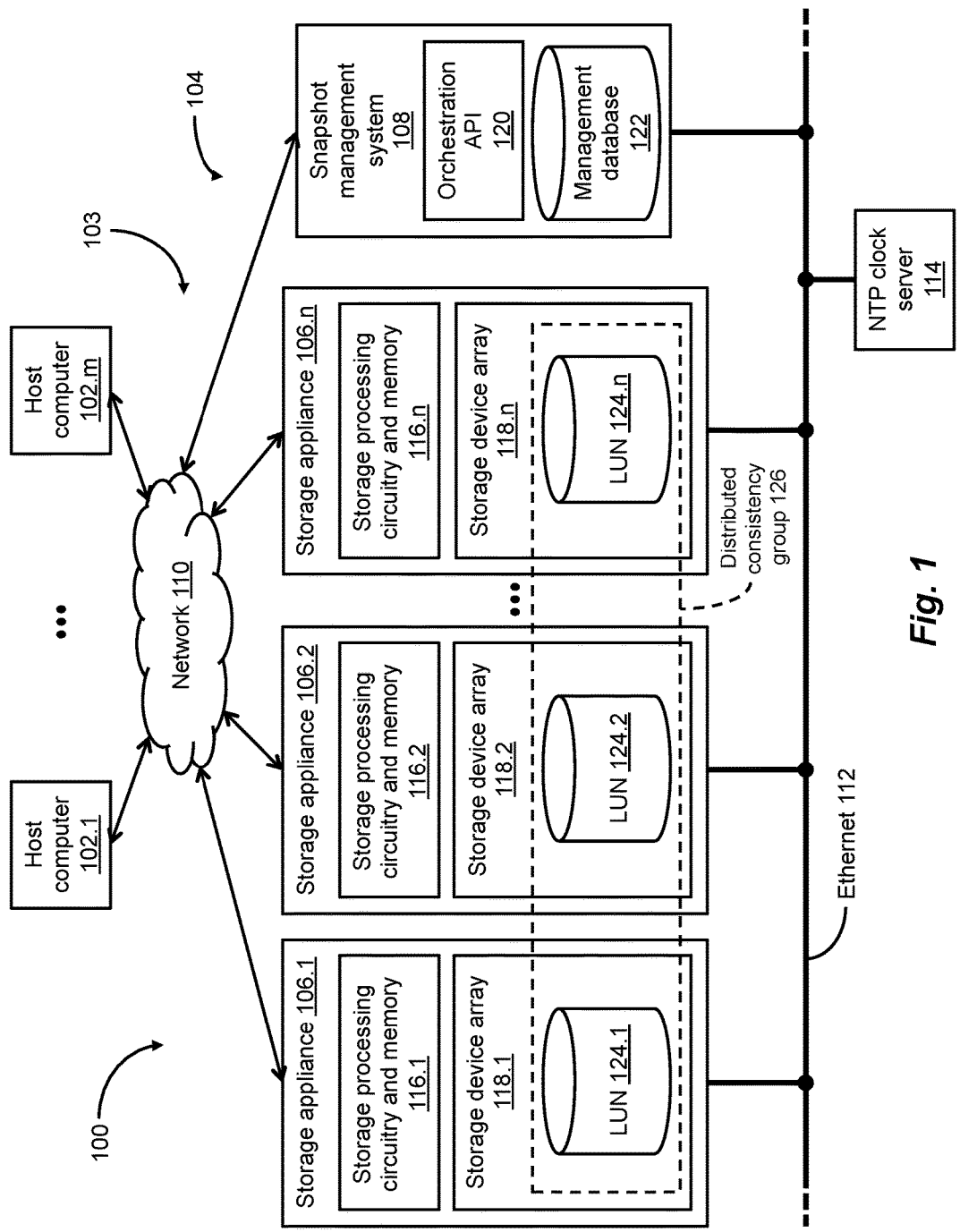
FIG. 1 is a block diagram of an exemplary environment in which an exemplary data storage system configured to synchronize snapshot operations in a distributed consistency group of storage volumes can be employed.

FIG. 1 depicts an illustrative embodiment of an exemplary data storage environment 100, in which an exemplary data storage system 104 configured to synchronize snapshot operations in a distributed consistency group of storage volumes can be employed. As shown in FIG. 1, the data storage environment 100 includes a plurality of host computers 102.1, . . . , 102.m communicably coupled to the data storage system 104 by a communications medium 103 that includes a network 110. For example, each of the plurality of host computers 102.1, . . . , 102.m can be configured as a web server computer, a file server computer, an email server computer, an enterprise server computer, a database server, and/or any other suitable computer or computerized device for providing input/output (I/O) requests (e.g., small computer system interface (SCSI) commands) to the data storage system 104 over the communications medium 103. Such I/O requests provided by the plurality of host computers 102.1, . . . , 102.m can direct the data storage system 104 to store and/or retrieve blocks of data from virtual volumes on behalf of the respective host computers 102.1, . . . , 102.m.

The communications medium 103 can be configured to interconnect the plurality of host computers 102.1, . . . , 102.m and the data storage system 104 to enable them to communicate and exchange electronic signals. As shown in FIG. 1, at least a portion of the communications medium 103 is illustrated as a "cloud" to indicate that the communications medium 103 can have a variety of different topologies including, but not limited to, backbone, hub-and-spoke, loop, irregular, or any suitable combination thereof. The communications medium 103 can also include, but is not limited to, copper based data communications devices and cabling, fiber optic devices and cabling, wireless devices, or any suitable combination thereof. In addition, the communications medium 103 can be configured to support storage area network (SAN) based communications, local area network (LAN) based communications, cellular communications, wide area network (WAN) based communications, distributed infrastructure communications, and/or any other suitable communications.

As shown in FIG. 1, the data storage system 104 can include a plurality of storage appliances 106.1, 106.2, . . . , 106.n, a computerized snapshot management system 108, and a network time protocol (NTP) server 114, each of which can be coupled to an Ethernet sub-network 112 or any other suitable network or sub-network. The plurality of storage appliances 106.1, 106.2, . . . , 106.n can include a plurality of storage processing circuitry and memory components 116.1, 116.2, . . . , 116.n, respectively, as well as a plurality of storage device arrays 118.1, 118.2, . . . , 118.n, respectively. Each of the storage processing circuitry and memory components 116.1, 116.2, . . . , 116.n can include one or more physical storage processors or engines, data movers, director boards, blades, I/O modules, storage drive controllers, switches, and/or any other suitable computer hardware or combination thereof. For example, the plurality of storage processing circuitry and memory components 116.1, 116.2, . . . , 116.n can be configured to process I/O requests from one or more of the host computers 102.1, . . . , 102.m, and store host data in a redundant array of independent disk (RAID) environment implemented by the plurality of storage device arrays 118.1, 118.2, . . . , 118.n. In certain embodiments, the plurality of storage processing circuitry and memory components 116.1, 116.2, . . . , 116.n can be configured to process such I/O requests and store host data in a cloud-based storage environment or any other suitable data storage environment. The storage processing circuitry and memory components 116.1, 116.2, . . . , 116.n can each further include persistent memory storage (e.g., flash memory, magnetic memory) and non-persistent cache memory storage (e.g., dynamic random access memory (DRAM), static random access memory (SRAM)), and accommodate a variety of software constructs including, but not limited to, operating system code and data, data storage system code and data, and snapshot operation pre-scheduling code and data. The plurality of storage device arrays 118.1, 118.2, . . . , 118.n can store a plurality of storage volumes 124.1, 124.2, . . . , 124.n, respectively, each of which can be implemented as a logical storage unit (LUN), a virtual machine volume (VVOL), or any other suitable storage unit or volume.

As further shown in FIG. 1, the computerized snapshot management system 108 can include an orchestration application programming interface (API) 120 and a management database 122. The orchestration API 120 can be configured to determine at least (1) an overall network configuration of the data storage system 104, (2) which storage appliances 106.1, 106.2, . . . , 106.n are connected to which storage device arrays 118.1, 118.2, . . . , 118.n, and (3) where the LUNs 124.1, 124.2, . . . , 124.n are located with respect to the storage device arrays 118.1, 118.2, . . . , 118.n, as well as create one or more consistency groups (such as a distributed consistency group 126; see FIG. 1) for the LUNs 124.1, 124.2, . . . , 124.n. The management database 122 can be configured to store information pertaining to at least the network configuration of the data storage system 104, and the locations of the LUNs 124.1, 124.2, . . . , 124.n within the data storage system 104, as well as one or more schedules (e.g., a schedule 300; see FIG. 3b) for performing discrete operations for the purpose of taking snapshots of the LUNs 124.1, 124.2, . . . , 124.n within the distributed consistency group 126. The management database 122 can also be configured to store individual members of specific consistency groups, such as the LUNs 124.1, 124.2, . . . , 124.n of the distributed consistency group 126 (see FIG. 1).

As employed herein, the term "snapshot" refers to a point-in-time (PIT) replication of a storage volume (e.g., a LUN, sub-LUN, VVOL) along with its associated metadata. Such a snapshot can replicate a full copy of data from a storage volume (e.g., a base LUN), or replicate a space-efficient copy by storing differences between a current version of the data and a prior version of the data at a PIT when a snapshot of the storage volume was last taken. For example, such space-efficient copies can be used to replicate snapshots on remote systems. As employed herein, the term "consistency group" refers to a set of storage volumes of an application stored on at least one storage appliance, and the term "distributed consistency group" refers to a set of storage volumes of an application in which one or more of the storage volumes are stored and distributed across a cluster of storage appliances connected to a network or sub-network. As shown in FIG. 1, the distributed consistency group 126 includes the set of storage volumes (e.g., LUNs) 124.1, 124.2, . . . , 124.n stored and distributed across the cluster of storage appliances 106.1, 106.2, . . . , 106.n, each of which is connected to the Ethernet 112 sub-network.

Figure 2:
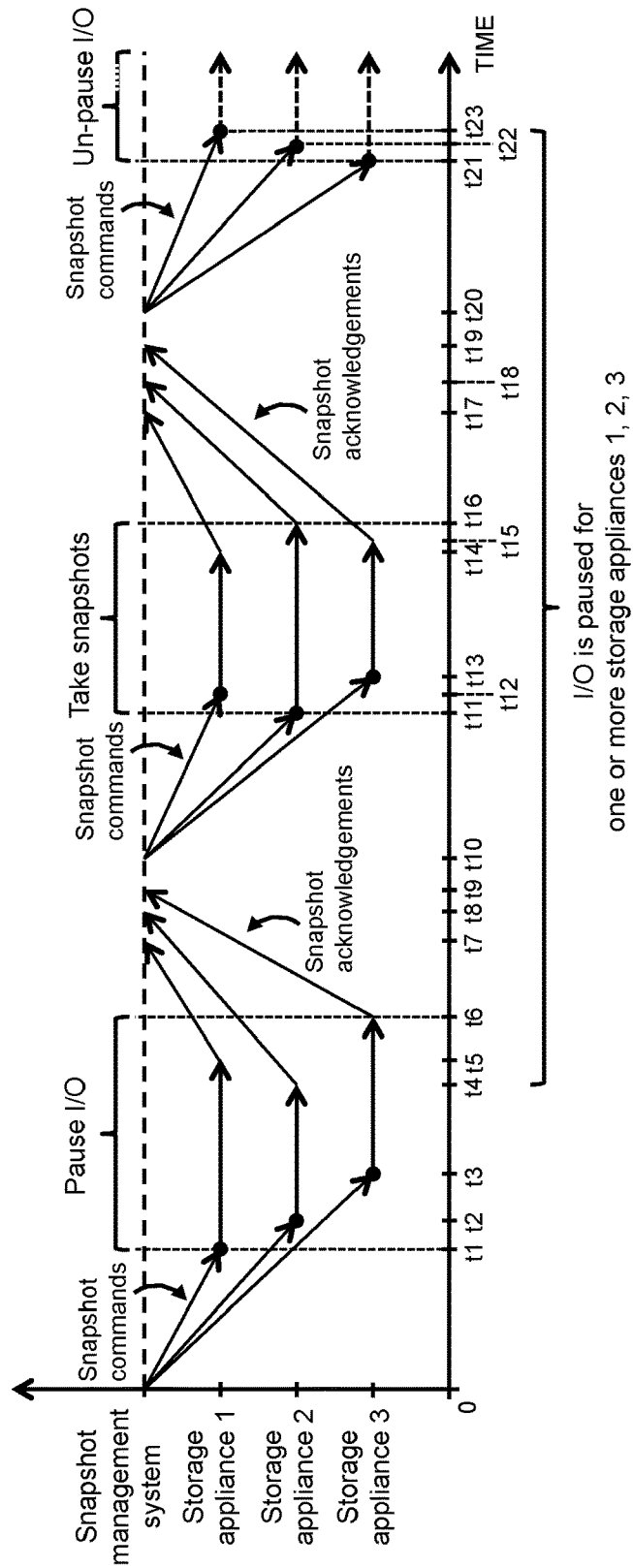
FIG. 2 is a timing diagram illustrating snapshot operations performed by a conventional data storage system to obtain a point-in-time (PIT) view of a consistency group of storage volumes.

FIG. 2 is a timing diagram illustrating a conventional approach to obtaining snapshots of a set of storage volumes in a consistency group. With reference to FIG. 2, the storage volumes are stored and distributed across a cluster of storage appliances 1, 2, 3 (not shown), such as in a distributed consistency group. Further, snapshot operations performed for the purpose of taking snapshots of the storage volumes in the distributed consistency group are orchestrated in real-time by a conventional snapshot management system (not shown). Such snapshot operations can include pausing (or suspending) I/O requests (e.g., write/read requests) from one or more host computers, taking snapshots of the storage volumes stored on the storage appliances 1, 2, 3, and un-pausing (or resuming) I/O requests from the host computers. To obtain the snapshots of the storage volumes in the distributed consistency group, the snapshot management system sequentially issues snapshot commands to the respective storage appliances 1, 2, 3, and receives snapshot acknowledgements from the respective storage appliances 1, 2, 3.

As shown in FIG. 2, the snapshot management system issues, at time "0", a first snapshot command to each of the storage appliances 1, 2, 3 for pausing I/O requests from the respective host computers. The first snapshot commands for pausing the I/O requests arrive at the storage appliances 1, 2, 3 at times t1, t2, and t3, respectively. Based at least on the storage system architecture and/or load, varying intervals of time may be required for the storage appliances 1, 2, 3 to complete a snapshot operation specified by the first snapshot command. For example, to complete the "pause I/O" operation, the storage appliance 1 may require a time interval from time t1 to time t5, the storage appliance 2 may require a time interval from time t2 to time t4, and the storage appliance 3 may require a time interval from time t3 to time t6. After the respective storage appliances 1, 2, 3 complete the "pause I/O" operation, each storage appliance 1, 2, 3 sends a first snapshot acknowledgement to the snapshot management system. For example, the storage appliance 1 may send a first snapshot acknowledgement at time t5 that arrives at the snapshot management system at time t7. Further, the storage appliance 2 may send a first snapshot acknowledgement at time t4 that arrives at the snapshot management system at time t8, and the storage appliance 3 may send a first snapshot acknowledgement at time t6 that arrives at the snapshot management system at time t9.

Once the storage appliances 1, 2, 3 have completed the "pause I/O" operation and all of the corresponding first snapshot acknowledgements have arrived at the snapshot management system, the snapshot management system issues, at time t10, a second snapshot command to each of the storage appliances 1, 2, 3 for taking snapshots of the storage volumes stored on the respective storage appliances 1, 2, 3. The second snapshot commands for taking the snapshots of the storage volumes arrive at the storage appliances 1, 2, 3 at times t12, t11, and t13, respectively. For example, to complete the "take snapshots" operation, the storage appliance 1 may require a time interval from time t12 to time t14, the storage appliance 2 may require a time interval from time t11 to time t16, and the storage appliance 3 may require a time interval from time t13 to time t15. After the respective storage appliances 1, 2, 3 complete the "take snapshots" operation, each storage appliance 1, 2, 3 sends a second snapshot acknowledgement to the snapshot management system. For example, the storage appliance 1 may send a second snapshot acknowledgement at time t14 that arrives at the snapshot management system at time t17. Further, the storage appliance 2 may send a second snapshot acknowledgement at time t16 that arrives at the snapshot management system at time t18, and the storage appliance 3 may send a second snapshot acknowledgement at time t15 that arrives at the snapshot management system at time t19.

Once the storage appliances 1, 2, 3 have completed the "take snapshots" operation and all of the corresponding second snapshot acknowledgements have arrived at the snapshot management system, the snapshot management system issues, at time t20, a third snapshot command to each of the storage appliances 1, 2, 3 for un-pausing the I/O requests from the host computers. The third snapshot commands for un-pausing the I/O requests arrive at the storage appliances 1, 2, 3 at times t23, t22, and t21, respectively. It is noted that an overall time interval required by the respective storage appliances 1, 2, 3 for completing the "un-pause I/O" operation extends beyond time t23, as illustrated in FIG. 2. Accordingly, in the conventional approach to obtaining snapshots of the set of storage volumes stored and distributed across the cluster of storage appliances 1, 2, and 3, in which snapshot operations are orchestrated in real-time, the I/O requests from one or more host computers may be paused at one or more of the storage appliances 1, 2, 3 for a duration of time extending from at least time t4 to time t23 (see FIG. 2). It is noted that the time t4 to time t23 (see FIG. 2) is non-deterministic, and can be affected by the number of storage appliances as the number increases beyond three (3), for example. However, such an extended duration of time may violate specified I/O time-out requirements of one or more applications, potentially causing the applications to become unresponsive and/or crash.

During operation of the data storage system 104 (see FIG. 1), the computerized snapshot management system 108 can avoid orchestrating snapshot operations (e.g., pausing I/O requests, taking snapshots of storage volumes, un-pausing I/O requests) in real-time, as well as reduce the overall time during which I/O requests are paused, by pre-scheduling the discrete snapshot operations to be performed by the storage appliances 106.1, 106.2, . . . , 106.n.

Figure 3:
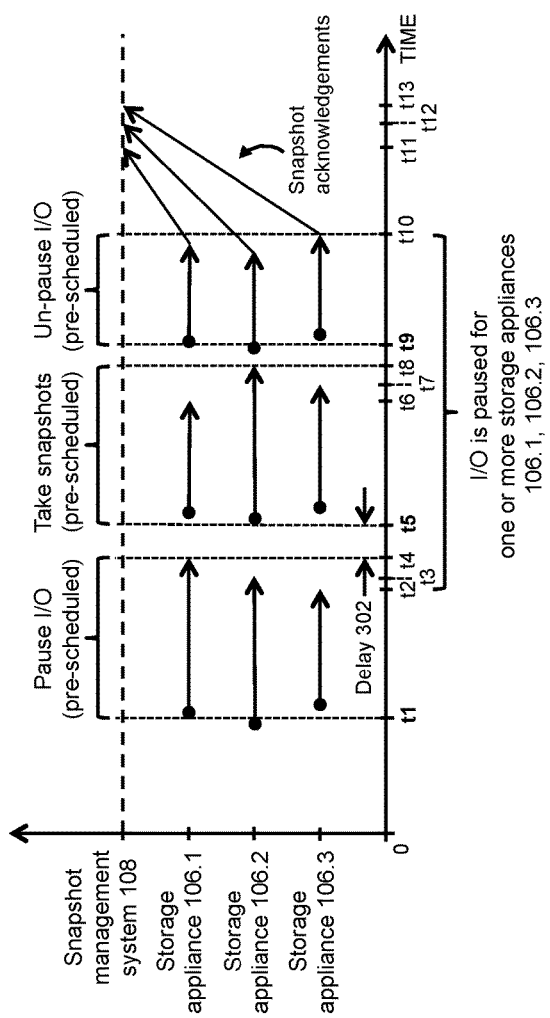

The operation of the data storage system 104 for synchronizing snapshot operations in the distributed consistency group 126 of storage volumes (e.g., LUNs) 124.1, 124.2, ..., 124.n will be further understood with reference to the following illustrative example, and FIGS. 1, 3a, and 3b. FIG. 3a is a timing diagram illustrating a plurality of pre-scheduled snapshot operations (e.g., pausing I/O requests, taking snapshots of storage volumes, un-pausing I/O requests) that can be performed by the data storage system 104 (see FIG. 1) to obtain a PIT view of the LUNs 124.1, 124.2, ..., 124.n within the distributed consistency group 126. As described herein, the management database 122 can be configured to store one or more schedules for performing discrete operations for the purpose of taking snapshots of the LUNs 124.1, 124.2, ..., 124.n. FIG. 3b is a diagram illustrating the exemplary schedule 300 for performing such discrete snapshot operations, which can include a "pause I/O" operation, a "take snapshots" operation, and an "un-pause I/O" operation, at exemplary times t1, t5, and t9, respectively. For example, a human operator using a graphical user interface (GUI) provided on a display (not shown) of the computerized snapshot management system 108 can specify a time at which the snapshots of the LUNs 124.1, 124.2, ..., 124.n are to be taken, and the snapshot management system 108 can automatically calculate the times t1, t5, and t9 when the "pause I/O" operation, the "take snapshots" operation, and the "un-pause I/O" operation, respectively, are to be performed based at least on the snapshot time specified by the human operator.

In this example, the snapshot management system 108 sends, through the orchestration API 120, a representation of the schedule 300 to each of the storage appliances 106.1, 106.2, ..., 106.n over the Ethernet 112 sub-network. As indicated in the schedule 300, the "pause I/O" operation is pre-scheduled to be performed by the respective storage appliances 106.1, 106.2, ..., 106.n at time t1. To minimize skew and/or drift between internal clocks of the storage appliances 106.1, 106.2, ..., 106.n, as well as assure that the "pause I/O" operation is performed by the respective storage appliances 106.1, 106.2, ..., 106.n as close as possible to the pre-scheduled time t1, all of the storage appliances 106.1, 106.2, ..., 106.n are time synchronized by the NTP server 114 using any suitable NTP technique for synchronizing time across a network. For example, the snapshot management system 108 can determine clock skew for the storage appliances 106.1, 106.2, ..., 106.n by issuing calls to the internal clocks on the respective storage appliances 106.1, 106.2, ..., 106.n, and asking them to report their local times back to the snapshot management system 108. Further, the snapshot management system 108 can determine whether or not one or more delays are required in the schedule 300 by accounting for a round trip time (RTT) for each issued call, and comparing the local times of the storage appliances 106.1, 106.2, ..., 106.n to the clock time of the snapshot management system 108. If the clock skew for the storage appliances 106.1, 106.2, ..., 106.n is determined to be too large, then the snapshot operation can be aborted. As shown in FIG. 3a, each of the storage appliances 106.1, 106.2, 106.3 commences the pre-scheduled "pause I/O" operation at about time t1, allowing for any remaining skew/drift that might occur in their respective internal clocks. It is noted that such remaining skew/drift would be much less than any interval of time required to pause I/O requests at the respective storage appliances 106.1 106.2, 106.3. It is further noted that the storage appliances 106.1, 106.2, 106.3 commence the pre-scheduled "pause I/O" operation at about time t1, without first being issued corresponding snapshot commands in real-time from the snapshot management system 108.

As further shown in FIG. 3a, the storage appliance 106.1 is the last storage appliance among the respective storage appliances 106.1 106.2, 106.3 to complete the "pause I/O" operation. In this example, the storage appliance 106.1 completes the "pause I/O" operation at time t4. To assure that I/O requests are paused at all of the storage appliances 106.1, 106.2, ..., 106.n before any snapshots of the LUNs 124.1, 124.2, ..., 124.n are taken, the schedule 300 incorporates a delay (as illustrated by a delay 302 from time t4 to time t5; see FIG. 3a) prior to the time (e.g., time t5; see FIG. 3b) that the "take snapshots" operation is scheduled to be performed. For example, the delay 302 can be equal to at least twice the average skew and/or drift between the internal clocks of the storage appliances 106.1, 106.2, ..., 106.n.

As indicated in the schedule 300, the "take snapshots" operation is pre-scheduled to be performed by the respective storage appliances 106.1, 106.2, ..., 106.n at time t5. Because the storage appliances 106.1, 106.2, ..., 106.n are time synchronized by the NTP server 114, the "take snapshots" operation is performed by the respective storage appliances 106.1, 106.2, ..., 106.n as close as possible to the pre-scheduled time t5, taking into account any remaining skew/drift occurring in the internal clocks of the storage appliances 106.1, 106.2, ..., 106.n. It is noted that the storage appliances 106.1, 106.2, 106.3 commence the pre-scheduled "take snapshots" operation at about time t5, without first being issued corresponding snapshot commands in real-time from the snapshot management system 108. As shown in FIG. 3a, the storage appliance 106.2 is the last storage appliance among the respective storage appliances 106.1 106.2, 106.3 to complete the "take snapshots" operation. In this example, the storage appliance 106.2 completes the "take snapshots" operation at time t8.

As further indicated in the schedule 300, the "un-pause I/O" operation is pre-scheduled to be performed by the respective storage appliances 106.1, 106.2, ..., 106.n at time t9. Because the storage appliances 106.1, 106.2, ..., 106.n are time synchronized by the NTP server 114, the "un-pause I/O" operation is performed by the respective storage appliances 106.1, 106.2, ..., 106.n as close as possible to the pre-scheduled time t9, taking into account any remaining skew/drift occurring in the internal clocks of the storage appliances 106.1, 106.2, ..., 106.n. It is noted that the storage appliances 106.1, 106.2, 106.3 commence the pre-scheduled "un-pause I/O" operation at about time t9, without first being issued corresponding snapshot commands in real-time from the snapshot management system 108. After the storage appliances 106.1, 106.2, 106.3 complete the "un-pause I/O" operation, each storage appliance 106.1, 106.2, 106.3 sends a snapshot acknowledgement, including a copy of the snapshot taken at the storage appliance 106.1, 106.2, 106.3, to the snapshot management system 108. For example, the snapshot acknowledgement sent by the storage appliance 106.1 may arrive at the snapshot management system 108 at time t11. Further, the snapshot acknowledgement sent by the storage appliance 106.2 may arrive at the snapshot management system 108 at time t12, and the snapshot acknowledgement sent by the storage appliance 106.3 may arrive at the snapshot management system 108 at time t13.

Accordingly, by pre-scheduling each of the discrete snapshot operations to be performed by the storage appliances 106.1, 106.2, 106.3, namely, the "pause I/O" operation, the "take snapshots" operation, and the "un-pause I/O" operation, at a predetermined time, the amount of real-time communications (e.g., issuing snapshot commands, receiving snapshot acknowledgements) required to complete the snapshot operations is reduced to a single set of snapshot acknowledgements, which, in this example, are sent by the respective storage appliances 106.1, 106.2, 106.3 to the snapshot management system 108 once all of the discrete snapshot operations have been completed. Because the amount of real-time communications is reduced to the single set of snapshot acknowledgements, the I/O requests from one or more host computers are paused at one or more of the storage appliances 106.1, 106.2, 106.3 for a reduced duration of time, extending from about time t2 to time t10 (see FIG. 3a).

As described herein, a "snapshot" refers to a PIT replication of a storage volume (e.g., a LUN, sub-LUN, VVOL) along with its associated metadata. Such metadata associated with a snapshot can include a first timestamp indicating the time when I/O requests were paused at the storage appliance where the snapshot was taken, and a second timestamp indicating the time when the snapshot was taken at the storage appliance. In this example, the time when the snapshot was taken corresponds to the time when the "take snapshots" operation was completed at the respective storage appliances 106.1, 106.2, 106.3. Accordingly, with reference to FIG. 3a, the first timestamp associated with the snapshot taken at the storage appliance 106.1 corresponds to time t4. Further, the first timestamp associated with the snapshot taken at the storage appliance 106.2 corresponds to time t3, and the first timestamp associated with the snapshot taken at the storage appliance 106.3 corresponds to time t2. In addition, the second timestamp associated with the snapshot taken at the storage appliance 106.1 corresponds to time t6. Further, the second timestamp associated with the snapshot taken at the storage appliance 106.2 corresponds to time t8, and the timestamp associated with the snapshot taken at the storage appliance 106.3 corresponds to time t7.

Having received the single set of snapshot acknowledgements from the storage appliances 106.1, 106.2, 106.3 (including the copies of the snapshots taken at the storage appliances 106.1, 106.2, 106.3 and their associated metadata), the snapshot management system 108 reconciles the snapshots using the associated timestamps to assure their validity. For example, the snapshot management system 108 can reconcile the snapshots by determining whether the first timestamps indicating the times when I/O requests were paused, and the second timestamps indicating the times when the snapshots were taken, align properly to provide a PIT replication of the LUNs 124.1, 124.2, 124.3 in the distributed consistency group 126, while satisfying specified I/O time-out requirements of applications. The snapshot management system 108 can then store one or more records of the reconciled and validated snapshots for the distributed consistency group 126 in the management database 122.

Figure 4:
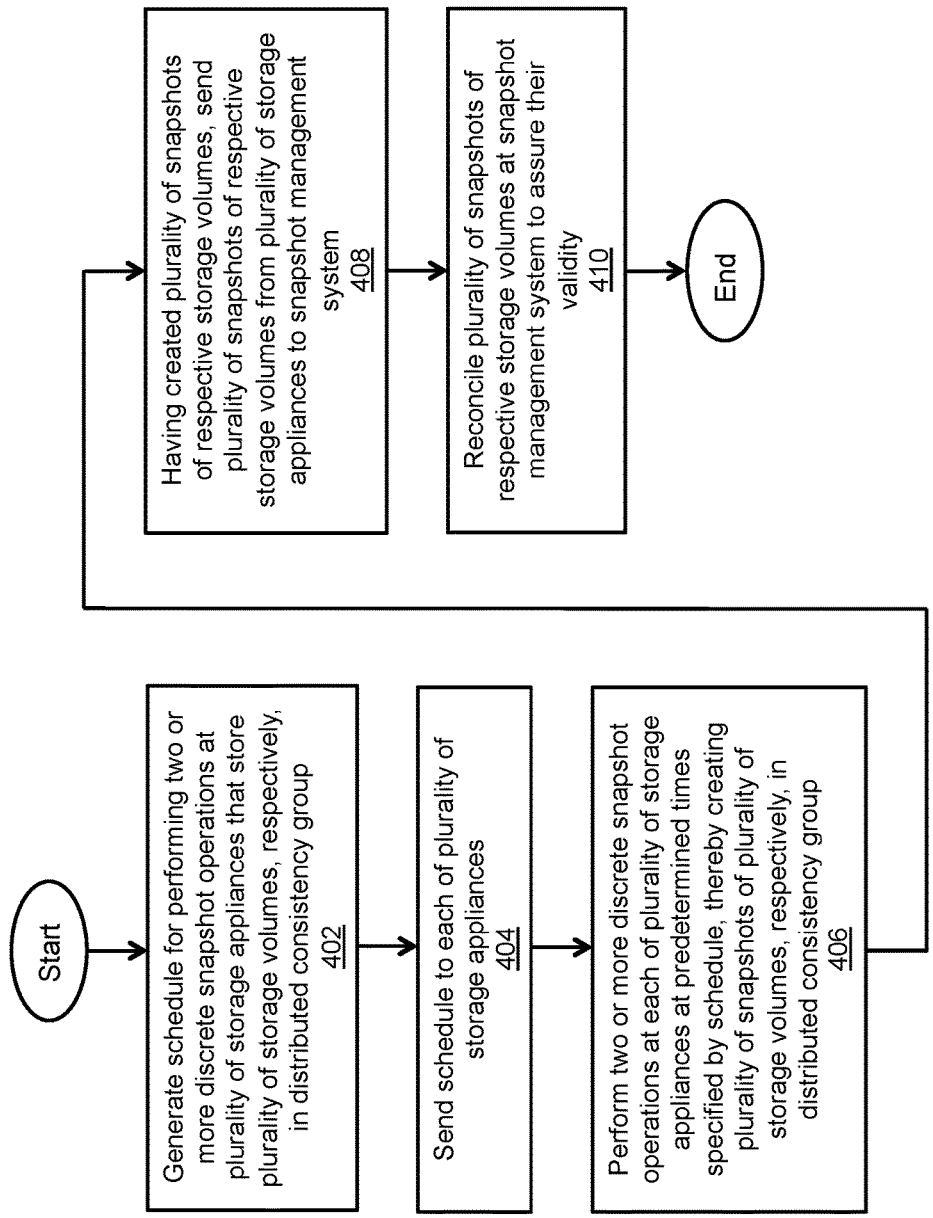
FIG. 4 is a flow diagram of an exemplary method of synchronizing snapshot operations in a distributed consistency group of storage volumes within the data storage system of FIG. 1.

An exemplary method of synchronizing snapshot operations in a distributed consistency group of storage volumes is described below with reference to FIGS. 1 and 4. As depicted in block 402 (see FIG. 4), a schedule is generated for performing two or more discrete snapshot operations at the plurality of storage appliances 106.1, 106.2, ..., 106.n that store the plurality of storage volumes 124.1, 124.2, ..., 124.n, respectively, in the distributed consistency group 126 (see FIG. 1). The schedule specifies predetermined times when the respective discrete snapshot operations are to be performed at the plurality of storage appliances 106.1, 106.2, ..., 106.n. As depicted in block 404, the schedule is sent to each of the plurality of storage appliances 106.1, 106.2, ..., 106.n. As depicted in block 406, the two or more discrete snapshot operations are performed at each of the plurality of storage appliances 106.1, 106.2, ..., 106.n at the predetermined times specified by the schedule, thereby creating a plurality of snapshots of the plurality of storage volumes 124.1, 124.2, ..., 124.n, respectively, in the distributed consistency group 126. As depicted in block 408, having created the plurality of snapshots of the respective storage volumes 124.1, 124.2, ..., 124.n, the plurality of snapshots of the respective storage volumes 124.1, 124.2, ..., 124.n are sent from the plurality of storage appliances 106.1, 106.2, ..., 106.n to the snapshot management system 108. As depicted in block 410, the plurality of snapshots of the respective storage volumes 124.1, 124.2, ..., 124.n are reconciled at the snapshot management system 108 to assure their validity.

Having described the above illustrative embodiments of the disclosed systems and methods, other alternative embodiments and/or variations may be made. For example, it was described herein that the snapshot management system 108 can determine whether or not one or more delays are required in the schedule 300 by accounting for the RTT between the snapshot management system 108 and each of the storage appliances 106.1, 106.2, ..., 106.n, and comparing the local times of the storage appliances 106.1, 106.2, ..., 106.n to the clock time of the snapshot management system 108. In certain alternative embodiments, round trip times (RTTs) between the snapshot management system 108 and the respective storage appliances 106.1, 106.2, ..., 106.n, as well as comparisons of the clock time of the snapshot management system 108 and the local times of the respective storage appliances 106.1, 106.2, ..., 106.n, can be taken into account at the time the snapshots of the respective storage volumes 124.1, 124.2, ..., 124.n are reconciled, in order to obtain a more accurate view of the clock skew of the individual storage appliances 106.1, 106.2, ..., 106.n.

It was further described herein that discrete snapshot operations to be performed by the storage appliances 106.1, 106.2, 106.3 can be pre-scheduled to allow the data storage system 104 to more easily satisfy I/O time-out requirements and avoid application unresponsiveness and/or crashes. In certain alternative embodiments, such discrete snapshot operations to be performed by the storage appliances 106.1, 106.2, 106.3 can be pre-scheduled to provide a crash-consistent snapshot operation of the distributed consistency group 126 for asynchronous applications. In such alternative embodiments, one or more crash-consistent copies of snapshots for the distributed consistency group 126 can be sent from a production site to a recovery site to recover from a failure (e.g., site disaster) that might have occurred at the production site.

It is noted that the disclosed systems and methods or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

While various embodiments of the invention have been particularly shown and described, it will be understood by those skilled in the art that various changes in form and details may be made therein without departing from the scope of the invention as defined by the appended claims.

What is claimed is:

1. A method of synchronizing snapshot operations in a distributed consistency group of storage volumes, comprising:
    generating a schedule for performing two or more discrete snapshot operations at a plurality of storage appliances that store a plurality of storage volumes, respectively, in the distributed consistency group, the schedule indicating predetermined times when the respective discrete snapshot operations are to be performed at the plurality of storage appliances;
    sending the schedule to each of the plurality of storage appliances;
    performing the two or more discrete snapshot operations at each of the plurality of storage appliances at the predetermined times indicated by the schedule to create a plurality of snapshots of the plurality of storage volumes, respectively, in the distributed consistency group; and
    reconciling the plurality of snapshots of the respective storage volumes in the distributed consistency group to assure their validity,
    wherein each snapshot among the plurality of snapshots has associated metadata, the associated metadata including a first timestamp indicating a first time when input/output (I/O) requests were paused at a respective storage appliance where the snapshot was taken, and a second timestamp indicating a second time when the snapshot was taken at the respective storage appliance, and
    wherein the reconciling of the plurality of snapshots of the respective storage volumes in the distributed consistency group includes determining whether the first timestamp and the second timestamp align to provide a point-in-time (PIT) replication of the respective storage volumes.

2. The method of claim 1 wherein the generating of the schedule includes generating the schedule for performing at least a first operation at a first predetermined time for pausing I/O requests at the respective storage appliances, and a second operation at a second predetermined time for taking snapshots of storage volumes stored by the respective storage appliances.

3. The method of claim 2 wherein the generating of the schedule includes incorporating, in the schedule, a delay prior to the second predetermined time to assure that the first operation is completed at the respective storage appliances before the second operation is performed at the respective storage appliances.

4. The method of claim 2 wherein the generating of the schedule includes generating the schedule for performing a third operation at a third predetermined time for un-pausing the I/O requests at the respective storage appliances.

5. The method of claim 1 further comprising:
    time synchronizing the plurality of storage appliances by a network time protocol (NTP) server.

6. The method of claim 1 further comprising:
    receiving, from the plurality of storage appliances, a plurality of snapshot acknowledgements including the plurality of snapshots, respectively, in the distributed consistency group.

7. A system for synchronizing snapshot operations in a distributed consistency group of storage volumes, comprising:
    a computerized snapshot management system;
    a plurality of storage appliances configured to store a plurality of storage volumes, respectively, in the distributed consistency group; and
    a network configured to interconnect the computerized snapshot management system and the plurality of storage appliances,
    wherein the computerized snapshot management system is operative:
        to generate a schedule for performing two or more discrete snapshot operations at the plurality of storage appliances, the schedule indicating predetermined times when the respective discrete snapshot operations are to be performed at the plurality of storage appliances; and
        to send the schedule to each of the plurality of storage appliances over the network,
    wherein each storage appliance among the plurality of storage appliances is operative:
        to perform the two or more discrete snapshot operations at the predetermined times indicated by the schedule to create a snapshot of a respective storage volume in the distributed consistency group stored by the storage appliance,
    wherein the snapshot of the respective storage volume has associated metadata, the associated metadata including a first timestamp indicating a first time when input/output (I/O) requests were paused at the storage appliance where the snapshot was taken, and a second timestamp indicating a second time when the snapshot was taken at the storage appliance, and
    wherein the computerized snapshot management system is further operative:
        to reconcile the snapshot of the respective storage volume in the distributed consistency group to assure its validity, including determining whether the first timestamp and the second timestamp align to provide a point-in-time (PIT) replication of the respective storage volume.

8. The system of claim 7 wherein the computerized snapshot management system is further operative to generate the schedule for performing at least a first operation at a first predetermined time for pausing the I/O requests at the storage appliance, and a second operation at a second predetermined time for taking the snapshot of the respective storage volume stored by the storage appliance.

9. The system of claim 8 wherein the computerized snapshot management system is further operative to incorporate, in the schedule, a delay prior to the second predetermined time to assure that the first operation is completed at the storage appliance before the second operation is performed at the storage appliance.

10. The system of claim 8 wherein the computerized snapshot management system is further operative to generate the schedule for performing a third operation at a third predetermined time for un-pausing the I/O requests at the storage appliance.

11. The system of claim 7 further comprising:
    a network time protocol (NTP) server connected to the network, the NTP server being operative to time synchronize the plurality of storage appliances.

12. The system of claim 7 wherein the computerized snapshot management system is further operative to receive, from the plurality of storage appliances, a plurality of snapshot acknowledgements including the plurality of snapshots, respectively, in the distributed consistency group.

13. The system of claim 7 wherein the network is one or more of a local area network (LAN), an Ethernet sub-network, a PCI or PCIe sub-network, a switched PCIe sub-network, a wide area network (WAN), a metropolitan area network (MAN), and the Internet.

14. The system of claim 7 wherein the plurality of storage volumes are one of logical storage units (LUNs), sub-LUNs, and virtual machine volumes (VVOLs).

15. A computer program product having a non-transitory computer readable medium that stores a set of instructions to synchronize snapshot operations in a distributed consistency group of storage volumes, the set of instructions, when carried out by computerized circuitry, causing the computerized circuitry to perform a method of:

generating a schedule for performing two or more discrete snapshot operations at a plurality of storage appliances that store a plurality of storage volumes, respectively, in the distributed consistency group, the schedule indicating predetermined times when the respective discrete snapshot operations are to be performed at the plurality of storage appliances;

sending the schedule to each of the plurality of storage appliances;

performing the two or more discrete snapshot operations at each of the plurality of storage appliances at the predetermined times indicated by the schedule to create a plurality of snapshots of the plurality of storage volumes, respectively, in the distributed consistency group; and reconciling the plurality of snapshots of the respective storage volumes in the distributed consistency group to assure their validity wherein each snapshot among the plurality of snapshots has associated metadata, the associated metadata including a first timestamp indicating a first time when input/output (I/O) requests were paused at a respective storage appliance where the snapshot was taken, and a second timestamp indicating a second time when the snapshot was taken at the respective storage appliance, and wherein the reconciling of the plurality of snapshots of the respective storage volumes in the distributed consistency group includes determining whether the first timestamp and the second timestamp align to provide a point-in-time (PIT) replication of the respective storage volumes.

16. The method of claim 15 wherein the generating of the schedule includes generating the schedule for performing at least a first operation at a first predetermined time for pausing I/O requests at the respective storage appliances, and a second operation at a second predetermined time for taking snapshots of storage volumes stored by the respective storage appliances.

17. The method of claim 16 wherein the generating of the schedule includes incorporating, in the schedule, a delay prior to the second predetermined time to assure that the first operation is completed at the respective storage appliances before the second operation is performed at the respective storage appliances.

18. The method of claim 16 wherein the generating of the schedule includes generating the schedule for performing a third operation at a third predetermined time for un-pausing the I/O requests at the respective storage appliances.

* * * * *